Feb. 3, 1970     B. A. KNAUTH     3,493,970
LORAN RELAY SYSTEM
Filed July 3, 1967
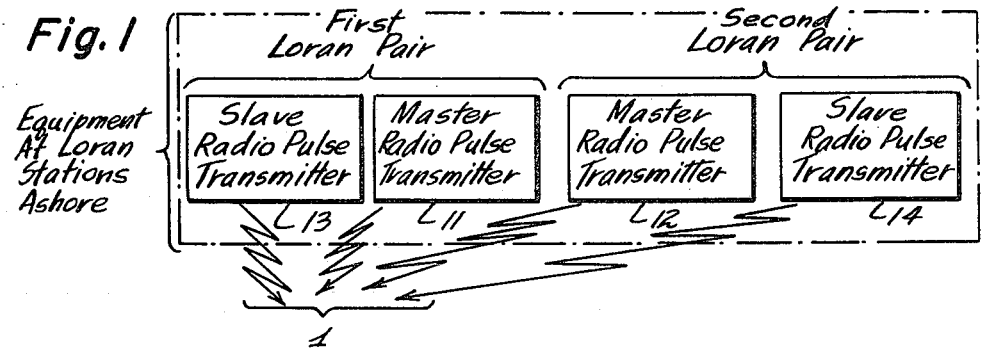
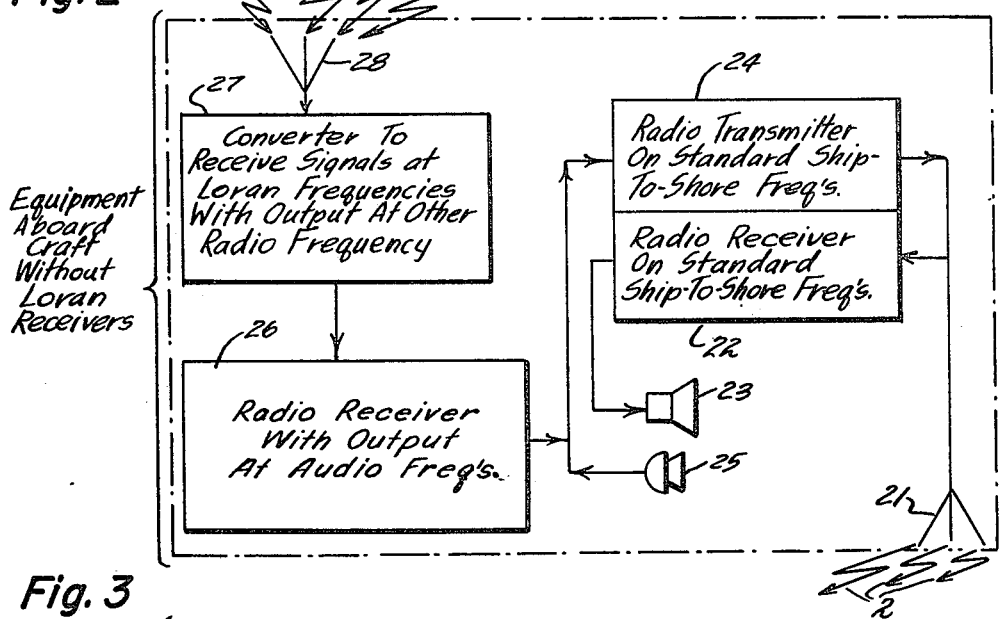
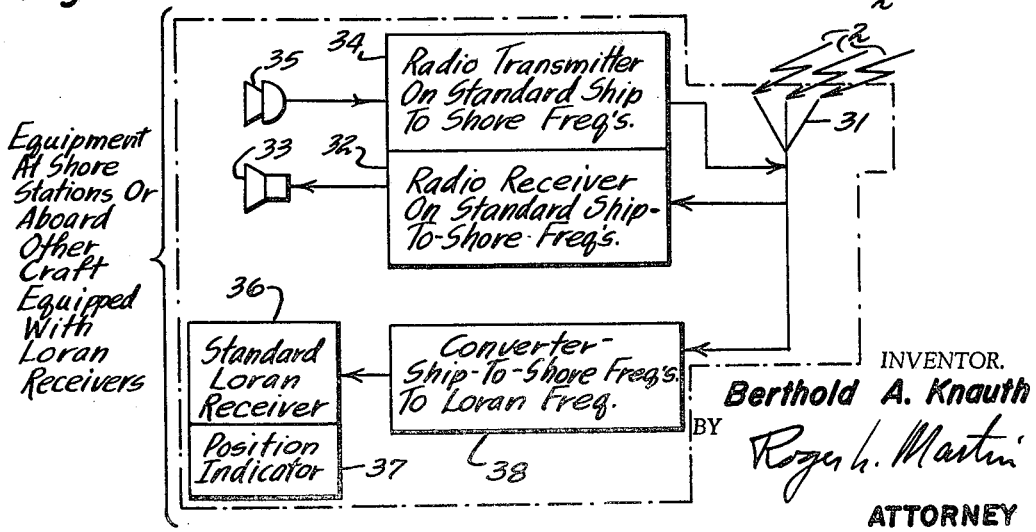
INVENTOR.
Berthold A. Knauth
BY
Roger L. Martin
ATTORNEY

United States Patent Office 3,493,970
Patented Feb. 3, 1970

3,493,970
LORAN RELAY SYSTEM
Berthold A. Knauth, Municipal Boat Basin,
Daytona Beach, Fla.
Filed July 3, 1967, Ser. No. 650,995
Int. Cl. G01s 1/24
U.S. Cl. 343—103     5 Claims

ABSTRACT OF THE DISCLOSURE

A radio relay system for determining the exact position of ships or aircraft not equipped with loran receivers, in which such a craft receives loran signals on a conventional radio receiver or receiver-converter as audio signals and relays these over the craft's normal radio communications equipment to another station equipped with normal communications equipment, a converter and a loran receiver, to thus permit this other station to determine the exact position of the relaying craft and use this information to render assistance, direct rescue operations or broadcast the relaying craft's position as may be necessary.

BACKGROUND OF THE INVENTION

This invention relates to systems for relaying radio signals. More particularly this invention relates to relay systems whereby radio location signals received at one point may be relayed to another point to thereby fix the location where first received. Specifically this invention is primarily directed toward systems whereby loran signals received aboard a ship at sea or an aircraft are relayed by said ship or aircraft to other ships, aircraft or shore stations to permit an exact determination by said other stations of the precise location of the ship or aircraft receiving and relaying said loran signals.

The loran system of radio navigation and radio location is well known and is extensively used throughout the world. It is described in detail in a 1948 M.I.T. Radiation Laboratory book "Loran" by J. A. Pierce, A. A. McKensie and R. H. Woodward, published by McGraw-Hill, and in many patents.

Basically the loran system comprises the transmission of pulsed radio signals from ground stations and receiving these aboard a ship or aircraft. The time delay between the moment of their reception represents a measure of the distances between the transmitting stations and the receiving station, this time delay resulting from the velocity of propagation of radio signals over the paths traveled. By measuring the differences in time delays between signals transmitted simultaneously (or with fixed time delay in their transmission) by a pair of transmitting stations at spaced fixed locations, there can be obtained hyperbolic curves representing the locus of points in space, the foci of these curves being the transmitting stations. By obtaining two or more such hyperbolic curves, and determining at which point in space these curves intersect, the exact position of the receiving station can be determined.

The loran system of hyperbolic navigation provides for the transmission by one radio station at a fixed location of periodic master pulses of fixed length in microseconds, and at established intervals such as 25 pulses per second, and the transmission from another radio station spaced at some distance from the "master" station, of slave pulses, delayed in time but otherwise identical with the master pulses. A second set of master and slave pulses, differing in characteristics, such as in frequency or in pulse recurrent rates (e.g. 25¼₆ pulses per second) are similarly transmitted by another pair of master and slave radio stations. Reception of these several sets of master and slave pulses, and comparison for each set of the time delays between master and slave pulses, permits a receiving station, such as a ship or an aircraft, to determine its exact position, by reference to charts on which are shown the hyperbolic curves for pairs of "master" and "slave" stations whose radio signals cover the area represented by the chart.

In order to accurately determine its position, a ship or aircraft must have a specially designed and complex loran receiver which will accurately determine the time delay between the master and slave pulses received from a pair or more of loran transmitting stations. Such receivers are expensive, are difficult to maintain, and require considerable training and experience to be satisfactorily operated to give sufficiently accurate position determining signals aboard ships and aircraft. As a result, despite the extensive network of loran transmitting stations providing wide coverage of loran signals for use by all ships and aircraft for accurate determination of their exact location, many surface and aircraft are not equipped with loran receivers, or personnel qualified to operate such receivers for accurate position determination.

However, for safety purposes, almost all ships and aircraft are equipped with radio communication equipment, both receivers and transmitters. Such equipment, while primarily utilized for general communication purposes, may be utilized in emergencies to summon assistance. For this purpose, certain frequencies and procedures have been established and are frequently utilized by surface and aircraft. In many such emergencies, it is imperative that the exact location of the ship or aircraft summoning assistance be determined in order that there will be no delay in locating the ship or aircraft and in rendering the required assistance. Frequently, and especially under emergency conditions, a ship or aircraft does not know its exact location, if it is not equipped with accurate radio navigation equipment such as a loran receiver, and therefore is unable to furnish its exact location. While in such cases, it is possible, by radio direction finding equipment and procedures, for shore stations and/or rescue ships to determine the position of the disabled ship or aircraft, such methods are often unsatisfactory since radio signals must be transmitted by the disabled craft frequently and for long enough periods of time for bearings to be taken by several shore stations or rescue ships, after which these bearings must be correlated before the disabled craft's position can be determined and relayed to the nearest rescue ship or station. Much time is thus lost at a time when time is of the essence.

SUMMARY

It is the purpose of my invention to provide a system whereby the position of surface craft and aircraft may be accurately and rapidly determined by shore stations and other craft on the sea or in the air. It is a further purpose of my invention to provide simple and reliable equipment whereby ships and aircraft may accurately and rapidly relay position determining data to shore stations and other craft. More specifically, it is an object of my invention to provide a system and equipment whereby ships and aircraft not eqipped with Loran equipment may relay Loran signals indicating their position to shore stations and other ships or aircraft which are equipped with loran receivers, whereupon the exact position of the relaying ship or aircraft may be determined in accordance with established loran procedures, as a result of which the relaying ship may be informed of its exact position, or assistance may be directed to the ship or aircraft in distress. Other purposes of my invention will be obvious to those skilled in the art by reference to the drawings and the disclosure forming a part of this patent application, these representing but one embodiment of the invention hereinafter claimed.

DESCRIPTION OF THE DRAWINGS

Referring to the single sheet of drawings, in which FIGS. 1, 2 and 3, each enclosed in dotted lines, and shown as interconnected by radio waves 1 and 2, illustrate, as one embodiment, the overall loran relay system of the invention herein described and claimed, FIG. 1 illustrates by block diagram the equipment at loran stations ashore; FIG. 2 illustrates by block diagram the equipment aboard surface craft and aircraft that are not equipped with loran receivers, and FIG. 3 illustrates by block diagram the equipment at the shore stations, or aboard other craft where loran receivers are available for utilization as part of the loran relay system of this invention.

In FIG. 1, there are shown two pair of conventional loran transmitting stations, each pair consisting of master radio pulse transmitters 11 and 12 and slave radio pulse transmitters 13 and 14. Loran pulse signals, 1, are transmitted from each pair of these transmitters. For each loran pair, the master pulse transmitting station is located at some distance from the slave pulse transmitter, although frequently the master stations for two pair of loran stations may be located at the same geographic position. The pulse transmitions of both the master and slave stations of each pair are synchronized in time such that they are transmitted simultaneously or with a fixed time delay between the master and the slave pulse. Transmissions of the radio frequency of the pulse transmissions and the pulse recurrence rate are identical for both the master and the slave stations of a loran pair, although these may differ from another pair of loran stations.

For example, the first loran pair of FIG. 1 may represent a master loran transmitter that is located at Charleston, S. C. and a slave transmitter that is located at Hobe Sound, Fla. The radio frequency used by these stations is 1959 kcs., and the pulses are transmitted at a pulse recurrence rate such that each pulse from the stations of this pair is transmitted 29,300 microseconds after the preceding pulse, i.e. approximately 33⅓ pulses per second but with a fixed time interval between pulses for this pair of loran stations. The Loran "rate" for this pair of stations is termed "1 H 7" on all loran charts and tables. The second loran pair of FIG. 1 may represent another master loran station, also located in Charleston, S. C. but having its slave station located at Cape Hatteras, N. C. with these stations transmitting similarly on a radio frequency of 1950 kc. but with a pulse recurrence rate such that each pulse from the stations of this pair is transmitted 29,400 microseconds after the preceding pulse, i.e. again approximately 33⅓ pulses per second but with this pair having assigned a slightly different fixed time interval between pulses. The loran "rate" for this pair of stations is termed "1 H 6" on all loran charts and tables.

Considering now FIG. 2 of single sheet of drawings, block diagrams are shown representing the equipment required aboard surface and aircraft, in accordance with my invention as part of the loran relay system, when these crafts have no loran receivers. In FIG. 2, reference number 21 indicates a conventional radio antenna aboard such craft which may be connected to a conventional marine type radio receiver 22, the output of which is shown connected to a loud speaker 23. Antenna 21 is shown as also being connected to a radio transmitter 24, whereby voice transmissions by means of a microphone 25 may be made by radio from the surface or aircraft. Frequently the receiver 22 and the transmitter 24 are combined as a transceiver for operation as a marine radio station or an aircraft radio station. The transmitting and receiving equipment 22 and 24 operate in conventional manner utilizing radio frequencies normally employed by surface and aircraft as assigned by regulatory authorities. In one embodiment of the loran radio relay system comprising this invention, radio frequency signals in the 2,000 kc. to 3,000 kc. frequency band are utilized, as assigned and authorized for ship-to-shore and ship-to-ship radio communication by a ship licensed to operate as a maritime mobile radio station, with use being made of such specific frequencies as 2,182 kcs., 2,638 kcs., 2,670 kcs., 2,738 kcs. and 2,830 for specified purposes.

For the purpose of the loran radio relay system herein described and as shown in FIG. 2, craft without specialized loran receivers and therefore incapable of determining their exact position from the signals transmitted by the loran stations shown in FIG 1, are provided with a radio receiver, 26 which will provide an output of signals at audio frequencies. Such output, may, if desired be listened to, as audible signals, but, in any event, in accordance with the teachings of this invention this output is utilized to modulate the radio transmitter 24, thus permitting the transmission, over the radio waves, 2, of a radio signal bearing the loran information received by the radio receiver 26. In this manner, the loran signals which indicate the exact position of the surface or aircraft, may be relayed over the assigned ship-to-ship or ship-to-shore radio channels, to other ship or to shore stations which are equipped with loran receivers, and which are utilized as a part of the loran relay system, as will be more fully described in connection with FIG. 3 below.

A converter 27, between the antenna, 28, and the radio receiver 26, can be utilized to receive loran signals, for example at 1950 kc. and convert these to some other frequency, for example a frequency of 1,000 kc., in which case the radio receiver 26 would be utilized to receive the 1,000 kc. signals and give an output at audio frequencies. In some cases, it may be possible to eliminate or bypass the converter 27, utilizing directly loran signals (at a frequency of 1950 kcs. in the example given above) as the input for the radio receiver. The use of a well shielded and grounded converter, 27, may be advisable when signals from the radio transmitter 24, emitted by the antenna 21, are found to be of such strength or are of such a frequency (for example near 2,000 kc.) as to cause blocking of the radio receiver 26, for example when this receiver is used directly to receive loran signals of a frequency of 1950 kc.

Preferably the antenna 28 is of such a design as to operate as a tuned antenna on the loran frequencies to be received, such as 1950 kc., in the examples herein set forth. Similarly the radio receiver 26 (and the converter 27 if used) should be designed to most effectively operate at the specific loran frequencies (or converter frequencies) in order that the pulsed loran signals furnished as audio input to the radio transmitter 24, and relayed by this transmitter, retain their optimum wave form and exact spacing in time, as received.

FIG. 3 of the single sheet of drawings presents, in block diagram form, the equipment required at shore stations or aboard other surface craft or aircraft which, because this equipment includes a conventional loran receiver, necessarily form a part of the loran relay system herein described.

A conventional radio antenna 31, which may receive radio signals 2, in connected to a conventional radio receiver 32, the audio output of which may be fed to loud speaker 33. The antenna 31 is also connected to a conventional radio transmitter 34, the audio input of which may be obtained by use of the microphone 35. The transmitter 34 and the receiver 32 may be combined as a transceiver. These equipments operate in conventional manner, for example, they may operate in the 2,000 kc. to 3,000 kc. band for ship-to-ship, or ship-to-shore communication on an assigned or authorized frequency.

Additionally, as shown in FIG. 3, as part of the loran relay system disclosed in this patent application, there is provided a standard loran receiver, 36, capable of operation on the standard loran frequencies, for example 1950 kc., which receiver has an indicator 37 of a conventional type, to indicate position as determined by the loran signals forming the input of the loran receiver.

The loran signals forming the input to the standard loran receiver 36 are obtained from the converter 38 which is designed to receive radio signals 2 from the antenna 31. These signals as previously indicated may originate from the ships equipped as indicated by FIG. 2, and, in accordance with the teachings of this invention, as herein above set forth, may contain information as to the exact position of such ships, in the form of the position indicating loran signals which were the output of the receiver 26 aboard such ships, used to modulate the transmitter 24.

As an example, the input to the converter 38 may consist of signals at a frequency within the ship-to-ship or ship-to-shore band, such as for example, 2,182 kcs., 2,638 kcs., 2,670 kcs., 2,738 kcs. or 2,830 kcs. The converter 38 is designed such that its output represents signals at frequencies of standard loran signals; for example 1950 kc. Thus the standard loran receiver 36 has as its input signals at standard loran frequencies, which signals may then be utilized in the conventional manner to indicate the position of surface craft or aircraft originating such signals, as originally received aboard craft without loran receivers, may thus be relayed over conventional radio transmitting and receiving equipment to shore stations or ships having loran receivers, whereupon position may be determined from the indicator 37, after which the ship not knowing its position may be so informed, for example by conventional use of the transmitter 34 and the microphone 35, or other ships which may be sufficiently near to provide prompt assistance may be informed of the exact position of a ship in distress.

In FIG. 3, the standard loran receiver with the antenna 31, may be utilized to receive loran signals directly from the antenna 31, thus bypassing the converter 38; for example such use may be desired when a ship desires to determine its own position by means of loran, or when a shore station desires to verify the operation of its standard loran receiver by obtaining a "fix" on its own (never changing) location.

DESCRIPTION OF THE PREFERRED EMBODIMENT

While a detailed description of the invention herein disclosed and claimed, including the preferred embodiments thereof, has been presented above in connection with the description of the drawings, there is now presented a description in some detail as to the manner in which the loran relay system which comprises this invention functions for the purposes designed. In this manner, it is believed that the invention may be better understood, when taken in connection with the drawings, the claims and the preceding explanations.

As an example, let us assume that there is a small fishing craft operating in the Atlantic Ocean approximately 90 miles due East of Daytona Beach, Florida. This fishing vessel is not equipped with a Loran receiver since such receivers are costly and since the personnel of this fishing craft have found it difficult to learn to operate the standard loran receivers. This fishing craft is, however, equipped with a standard maritime radio transceiver which it uses extensively on 2,638 kcs. to communicate with other fishing boats and with its headquarters at Inlet Harbor near Ponce de Leon Inlet, south of Daytona Beach. This fishing vessel is also equipped with a crystal permitting it to operate on a frequency of 2,182 kcs., which frequency is the international distress frequency for radio telephony and is also the international general radio telephone calling frequency for the maritime mobile service. This fishing vessel has also been equipped with a combination radio receiver and converter, in accordance with the teachings of this invention, which receiver and converter, using a separate antenna designed for operation on the loran frequency of 1950 kcs. This receiver-converter has a small loud speaker mounted on the bridge of the fishing vessel in such a position that the captain of the vessel may, if he so desires, listen to the loran signals being received by this equipment. In audible form these signals have a sound something like that of a low pitched wailing siren, gradually swinging in pitch from a low "noise like" staccato beat to a higher similar beat and then descending again, repeating continuously without interruption and presenting no discernable intelligence with respect to the position of the fishing craft. This equipment is however connectable by a jack plug into "ship-to-shore" radio transmitter aboard the fishing craft merely by removing the jack plug normally connecting the microplane to this transmitter and replacing this jack plug with one from the loran receiver-converter.

There is suddenly brought to the attention of the captain of the fishing vessel that his ship is leaking badly and has already settled somewhat in the water. The captain estimates that he will be unable to remain afloat more than approximately 2 hours and he immediately shifts his radio transmitter to the international distress frequency of 2,182 kcs. requesting immediate assistance, using the urgency signal "PAN," spoken three times and transmitted before his call letters.

Since the frequency of 2,182 kcs. is guarded continuously by the United States Coast Guard as well as by numerous coast stations and some ship stations, his call for help can be presumed to be promptly answered. Let us assume that the Coast Guard immediately contacts him on 2,182 kcs. requesting to be advised of the nature of the emergency, the urgency thereof and his exact location. Since the fishing vessel has been away from its home port for several days and has been operating on an irregular course, the captain of the fishing vessel is unable to indicate his exact position but can only advise that he believes that he is 75 to 100 miles east of Florida and probably somewhere between Jacksonville and Cape Kennedy in latitude. He does advise the Coast Guard however that his fishing vessel is equipped with loran relay equipment and that he could transmit the output of such equipment over his ship-to-shore radio if so instructed. The Coast Guard station immediately instructs him to make such a transmission for 60 seconds and to then stand by for further instructions. The captain of the fishing vessel acknowledges these instructions, indicates that he is immediately complying, and thereafter replaces the jack plug connecting his microplhone to his transmitter with the jack plug connecting the loran relay receiver-converter output to his transmitter, transmitting this output for a period of 60 seconds as directed.

In the area of the Atlantic Ocean where this fishing vessel is operating, loran signals are three different pairs of stations may be received. The loran rates for these stations are 1 H 4
1 H 6, and
1 H 7

These loran signals are being continuously transmitted on loran channel number 1, i.e. on a frequency of 1950 kcs. Depending upon propagation conditions it is possible that both the master and slave pulses of each pair of these loran signals are included in the output of the receiver-converter aboard the fishing craft and it is the combination of these signals that the captain of the fishcraft has been listening to. It is this combination of pulse signals which he now is transmitting to the Coast Guard station as received aboard his vessel.

At the Coast Guard station, and no doubt concurrently at other coastal stations and aboard ships which are listening on 2,182 kcs. some of which are also equipped with loran receivers, the loran signals as relayed by the fishing craft are received and may be heard in the identical form as heard aboard the fishing craft. However, the Coast Guard station as well as other shore stations and ship stations which have been equipped in accordance with the teachings of this application, may utilize a converter to shift the signals received on 2,182 kcs. (and which contain the 1 H 6, the 1 H 7, and the 1, H 4 pulses, both master and slave) to a standard loran frequency, for example 1950 kcs., thereafter feeding the output of the converter into a standard loran receiver. Then, in the conventional manner, the Coast Guard operator (as well as operators at other shore stations and aboard ships at sea similarly equipped), all well trained in the operation of the loran receivers, may quickly obtain readings from the loran receiver for each of the three loran rates 1 H 4, 1 H 6, and 1 H 7. Let us assume that these readings are as follows:

1 H 6–3450
1 H 7–2800
1 H 4–1066

The Coast Guard operator, using charts which show loran rates, immediately plots these three readings on his chart. Even with readings from only two pair of loran stations, he is able to determine, with considerable accuracy, that the fishing boat is almost 92 miles due east of Daytona Beach and may determine its exact position in latitude and longitude. The Coast Guard station is thus able to immediately relay to all ships at sea the exact position of the fishing boat that is in distress requesting that craft near this point proceed immediately to render assistance. Additionally ships at sea which have been equipped with a converter in accordance with the teachings of this application and which have aboard a standard loran receiver into which the output of the converter may be fed, may similarly determine, concurrently with the Coast Guard station, the exact location of the fishing craft in distress. Thus, if they are in the near vicinity of the ship in distress, they may proceed immediately to render assistance.

It may be necessary, upon instructions from the Coast Guard for the captain of the fishing craft to make additional transmissions of the Loran signals being received aboard his vessel. By such subsequent transmissions, the position of the ship in distress can be verified, and when such transmissions are made at ten or fifteen minute intervals by the ship in distress (as long as possible) there can be determined the drift of the ship in distress, an important factor in high winds and rough seas. Furthermore, the captain of the fishing craft can be advised of the assistance which is being rushed to his position and he may feel much more secure knowing that his exact position is known to all those coming to his assistance.

While the drawings and the description contained in this patent application had described the Loran Relay System of this invention in general terms and by means of only a limited number of examples and embodiments, it should be apparent to all those skilled in the art that many variations and deviations from the disclosure are possible without in any way limiting the scope of this invention in general terms.

What is claimed as new and what is desired to secure by Letters Patent of the United States is:

1. A loran relay system comprising means aboard a craft for receiving loran signals consisting of at least two pairs of pulses, and means for transmitting as radio signals the output of said receiving means, in combination with means at another location for receiving said radio signals as loran signals, and means for utilizing said loran signals to obtain position indications.

2. The system of claim 1 in which the output of said receiving means aboard said craft consist of audio signals which are utilized to modulate the radio signals transmitted from said craft.

3. The system of claim 1 in which the means aboard a craft for receiving loran signals comprise a converter tuned to the frequency of said loran signals and having an output of a differing frequency, which output is then utilized as the input for a radio receiver whose output is then transmitted as radio signals from said craft.

4. The system of claim 1 in which the means at said location other than aboard said craft for receiving said radio signals comprise a converter tuned to receive radio signals from said craft, the output of which consist of signals at loran frequencies, which are utilized as the input for conventional type loran receivers from which said position indications are obtained.

5. A loran relay system which comprises equipment aboard a craft for receiving loran signals consisting of at least two pairs of pulses and having an output of audio frequentcies, in combination with a radio transmitter wherein said audio frequencies modulate the carrier of said transmitter, and an antenna for radiating the output of said transmitter, said combination of equipment being associated with equipment at another location for receiving and converting said radiated output to signals at loran frequencies in combination with a loran receiver for obtaining position indications for said craft from said converted signals.

References Cited

UNITED STATES PATENTS 2,606,317   8/1952   Wallace.

RODNEY D. BENNETT, JR., Primary Examiner

M. F. HUBLER, Assistant Examiner